US012801175B2

(12) United States Patent
Saari

(10) Patent No.: US 12,801,175 B2
(45) Date of Patent: Nov. 17, 2026

(54) LOW-POWER CURRENT REFERENCE GENERATOR SYSTEMS AND METHODS

(71) Applicant: Analog Devices International Unlimited Company, Limerick (IE)

(72) Inventor: Daniel Henrik Saari, Limerick (IE)

(73) Assignee: Analog Devices International Unlimited Company, Limerick (IE)

(*) Notice: Subject to any disclaimer, the term of this patent is extended or adjusted under 35 U.S.C. 154(b) by 270 days.

(21) Appl. No.: 18/740,483

(22) Filed: Jun. 11, 2024

(65) Prior Publication Data

US 2024/0411336 A1 Dec. 12, 2024

Related U.S. Application Data

(60) Provisional application No. 63/472,510, filed on Jun. 12, 2023.

(51) Int. Cl.
*G05F 3/26* (2006.01)

(52) U.S. Cl.
CPC .................................... *G05F 3/267* (2013.01)

(58) Field of Classification Search
CPC ....................................................... G05F 3/267
See application file for complete search history.

(56) References Cited

U.S. PATENT DOCUMENTS

| | | | | |
|---|---|---|---|---|
| 6,894,473 B1 * | 5/2005 | Le | G05F 3/30 | 327/542 |
| 2006/0001413 A1 * | 1/2006 | Marinca | G05F 3/262 | 323/315 |
| 2017/0307451 A1 * | 10/2017 | Goumballa | G05F 3/267 | |
| 2018/0210480 A1 * | 7/2018 | Sone | G05F 3/267 | |
| 2019/0146542 A1 * | 5/2019 | Gottapu | G05F 3/267 | 327/542 |
| 2023/0107389 A1 * | 4/2023 | Wu | G05F 3/30 | 323/313 |
| 2023/0161369 A1 * | 5/2023 | Harris | G05F 3/30 | 327/539 |

OTHER PUBLICATIONS

De la Cruz et al., "A 1-V Ptat Current Reference Circuit with 0.05%/V Current Sensitivity to VDD", 2016 IEEE (Iscas), Aug. 11, 2016, Montreal, Qc, Ca, pp. 502-505 (4 pgs).

* cited by examiner

*Primary Examiner* — Rafael O Leon De Domenech
(74) *Attorney, Agent, or Firm* — DLA Piper LLP (US)

(57) ABSTRACT

Systems and methods embodiments are described for low-power, low-area current reference generator circuits that deliver a stable current bias for applications such as wake-up circuits. The current reference generator circuit provides for a nearly temperature-independent small-area bias current generator that uses a single pair of BJTs to reliably output a nominal 150 nA bias current that, irrespective of variations in process, supply voltage, and temperature (PVT), and local device mismatch, remains in a range between 120 nA and 180 nA. Advantageously, the circuit, which may be powered from and supply that is operationally functional at as low as about 1.0 V, does not require a calibration procedure or the combination of traditional PTAT and CTAT circuitries.

20 Claims, 6 Drawing Sheets

100

100

300

LOW-POWER CURRENT REFERENCE GENERATOR SYSTEMS AND METHODS

CROSS REFERENCE TO RELATED PATENT APPLICATIONS

The present application claims priority benefit, under 35 U.S.C. § 119(e), to commonly-assigned U.S. Provisional Patent Application No. 63/472,510, filed on Jun. 12, 2023, entitled "LOW-POWER CURRENT REFERENCE GENERATOR SYSTEMS AND METHODS", and listing as inventors Daniel Henrik Saari. Each reference mentioned in this patent document is incorporated by reference herein in its entirety.

BACKGROUND

A. Technical Field

The present disclosure relates generally to voltage and current reference generation systems and methods. More particularly, the present disclosure relates to systems and methods for low-power, low-area current reference generator circuits that deliver a stable current bias for applications such as wake-up circuits.

B. Background

Some chips used in low-power applications, such as automotive audio applications, contain an on-chip band-gap generator that delivers bias currents for various circuit blocks on the chip. During a deep sleep phase, i.e., prior to most circuits being enabled, this generator is disabled and, thus, unavailable to perform wake-up tasks. This poses challenges to next generation chip designs that require that wake-up receivers receive a wake up signal, e.g., from a circuit in a daisy chain of devices, to keep their amplifier turned on at all times so that it can process the received signal and decide whether to wake up itself and then the next circuit in the daisy chain from its low-power deep sleep state.

Many existing current reference generators generate a constant current by using a voltage ($\Delta V_{bg}$) to create a proportional to absolute temperature (PTAT) current that is then scaled and combined with a complementary to absolute temperature (CTAT) current having an opposite temperature coefficient such as to cancel out performance-reducing temperature variations and yield a constant temperature response. Such current reference generator designs oftentimes require differential amplifiers and are not well-suited for low-power applications due to a number of shortcomings, including a multiple relatively large, energy-hungry bipolar junction transistors (BJTs) stacked in cascaded stages, which also limits the minimum supply voltage, increased footprint, power consumption, and circuit complexity, and the need for trimming or calibrating those BJT.

To overcome these and similar limitations of existing designs, it is desirable to have low power, low silicon area current reference generator systems and methods that can maintain a relatively stable and well-defined low bias current, e.g., 150 nA, even during the deep sleep phase, ideally, without requiring access to digital circuitry to perform trimming or calibration operations and while keeping current variations within +/−20% (e.g., 120 nA-180 nA) during regular operation.

One exemplary embodiment herein provides for a nearly temperature-independent small-area bias current generator that uses a single pair of BJTs to reliably output a nominal 150 nA bias current that, irrespective of variations in process, supply voltage, and temperature (PVT), and local device mismatch, remains in a range between 120 nA and 180 nA.

Advantageously, the circuit, which may be powered from and supply that is operationally functional at as low as about 1.0 V, does not require a calibration procedure or the combination of traditional PTAT and CTAT circuitries.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
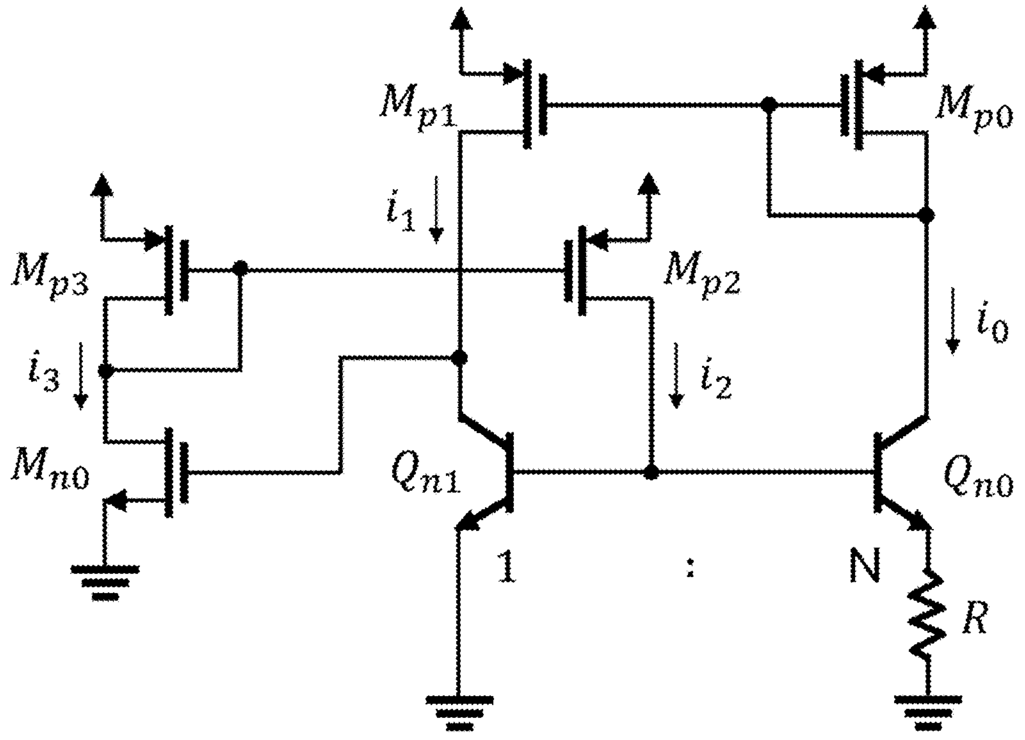
FIG. 1 is a simplified schematic of an exemplary low-power current reference generator circuit, according to various embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

Any headings used herein are for organizational purposes only and shall not be used to limit the scope of the description or the claims. Each reference/document mentioned in this patent document is incorporated by reference herein in its entirety.

It is noted that embodiments described herein are framed in the context of current reference generator designs, but one skilled in the art shall recognize that the concepts of the present disclosure are not limited to such applications and may equally be used in band-gap type generators and other contexts.

In this document the terms "transistor," "device," and "switch" are used interchangeably and refer to any type of switching devices recognized by one of skilled in the art. The term "substantially constant over a temperature range" means constant within temperature variations of at most +/−20%.

FIG. 1 is a simplified schematic of an exemplary low-power current reference generator circuit, according to various embodiments of the present disclosure. Circuit 100 comprises resistor R, which may be implemented as a high resistance resistor having a resistance value of, e.g., 500 kΩ and devices $M_{p0}$, $M_{p1}$, $M_{p2}$, $M_{p3}$. Here, the devices are implemented as transistors as n-type metal-oxide-semiconductor (NMOS) and p-type metal-oxide-semiconductor (PMOS) devices. Circuit 100 further comprises BJT devices $Q_{n0}$ and $Q_{n1}$. However, these are not intended as limitations on the scope of the present disclosure as one of skill in the art will appreciate, any type of transistor and doping method may be used.

As depicted in FIG. 1, BJT devices $Q_{n0}$ and $Q_{n1}$ are arranged in a manner such as to share a common base. In embodiments, BJT $Q_{n1}$ and MOS transistors $M_{n0}$, $M_{p2}$, and $M_{p3}$ form a feedback loop. Unlike common PTAT current reference generators that use a diode to connect to a BJT, in embodiments, the base current $i_2$ may be controlled via the feedback loop, which ensures proper biasing of BJTs $Q_{n0}$ and $Q_{n1}$. Transistors $M_{p2}$ and $M_{p3}$, which are of the same size (i.e., W/L), may be operated in saturation, e.g., by a startup circuit (not shown in FIG. 1), and have the same $V_{GS}$.

In operation, the base-emitter voltage difference ($V_{be1}-V_{be0}$) that develops across temperature-dependent resistor R gives rise to the current $i_0$, which flows through bipolar transistor $Q_{n0}$ and is PTAT in nature. This PTAT current is thus equal to $(V_{be1}-V_{be0})/R$, wherein $V_{be1}$ denotes the temperature-dependent base-emitter voltage that develops at BJT $Q_{n1}$ and, similarly, $V_{be0}$ denotes the PTAT base-emitter voltage that develops at $Q_{n0}$. Transistors $M_{p0}$ and $M_{p1}$ form the same current $i_1$ that also exhibits a PTAT characteristic.

In embodiments, the constant current $i_3$ may be mirrored to constant current $i_2$, which, as shown in the arrangement in FIG. 1, is injected into the base terminal of BJTs $Q_{n0}$ and $Q_{n1}$. Circuit analysis demonstrates that the current $i_3$ flowing through the output leg of the feedback loop can be written as:

$$i_3 = i_2 = 2i_0/\beta \qquad \text{(Eq. 1)}$$

Substituting $i_0=(V_{be1}-V_{be0})/R$ into Eq. 1, yields:

$$i_3 \propto \left(2 * k_B/q * R\right) * \ln(N) * \left(T/\beta(T)\right) \qquad \text{(Eq. 2)}$$

wherein $k_B$ is the Boltzmann constant, q is the elementary charge, R is the resistance value of the resistor coupled to the source of BJT $Q_{n0}$, N represents the emitter area ratio of the BJT devices $Q_{n0}$ and $Q_{n1}$, T represents temperature, and β is the current gain ("beta") factor of BJT $Q_{n0}$ that is defined by the collector current-to-base current ratio inherent in bipolar transistor devices.

The beta factor is a device parameter that is subject to process variations during manufacturing that result in variations in physical properties, as well as temperature variations during regular operation. Common nanoscale CMOS doping processes used in constructing BJTs causes the temperature-dependence of BJTs' β to be PTAT, i.e., its collector-base current is proportional to temperature or, more accurately, to absolute temperature.

As may be gleaned from Equation 2, this means that, in embodiments, the overall temperature-dependence of the output current $i_3$ is solely a function of N and R since the temperature-dependence of β cancels out with the temperature T component in the nominator, which stems from the base-emitter voltage difference $\Delta V_{be}$ (i.e., $V_{be1}-V_{be0}$) that is inherently PTAT. A person of skill in the art will appreciate that the ratio of the BJTs, N, can be well-controlled by using any number of different layout techniques. As a result, output current $i_3$ essentially varies in inverse proportion to the variability of resistance R.

Advantageously, the PTAT characteristic of β causes the ratio of the PTAT collector current $i_c$ to β to provide a base current $i_2$ that is substantially constant over a temperature range. In embodiments, the base current $i_2$ may then be mirrored to the output current $i_3$, which is also substantially immune to temperature variations within that temperature range.

Furthermore, device-to-device current gain variations inherent to bipolar devices that cause $V_{be}$ spread do not affect the temperature-dependence of the output current $i_3$, which, as demonstrated is practically decoupled from that of the beta factor β. Similarly, current gain variations that are relatively large at low current gains do not affect the temperature-dependence of the output current $i_3$, advantageously, permitting the use of low beta factor devices.

It is noted that low-power current reference generator circuit 100 illustrated in FIG. 1 is not limited to the constructional detail shown there or described in the accompanying text. For example, as those skilled in the art will appreciate, a suitable resistor may be fabricated as a high-resistance polyresistor, known to have good temperature characteristics, e.g., to allow circuit 100 to drive a receiver (not shown) within a relatively constant current $i_3$ that exhibits variations of less than about +/−20%. Those skilled in the art will further appreciate, in embodiments, resistor R may be substituted with an active device having a resistive component with a suitable temperature coefficient. Furthermore, resistor R may be implemented as a trimmable device that is adjusted in a test or calibration phase such as to improve accuracy and performance.

In embodiments, the teachings of the present disclosure may be applied to existing applications. For example, to construct a band-gap type generator that employs temperature compensation or correction techniques, resistor R may be implemented as a PTAT device, e.g., to obtain a current that is CTAT in nature (or vice versa, a CTAT device to obtain a PTAT current), such as to facilitate a traditional PTAT-CTAT combination to yield a reduced sensitivity of the reference current to temperature changes when exposed to varying operating conditions and, ideally, provide a constant temperature response.

Figure 2:
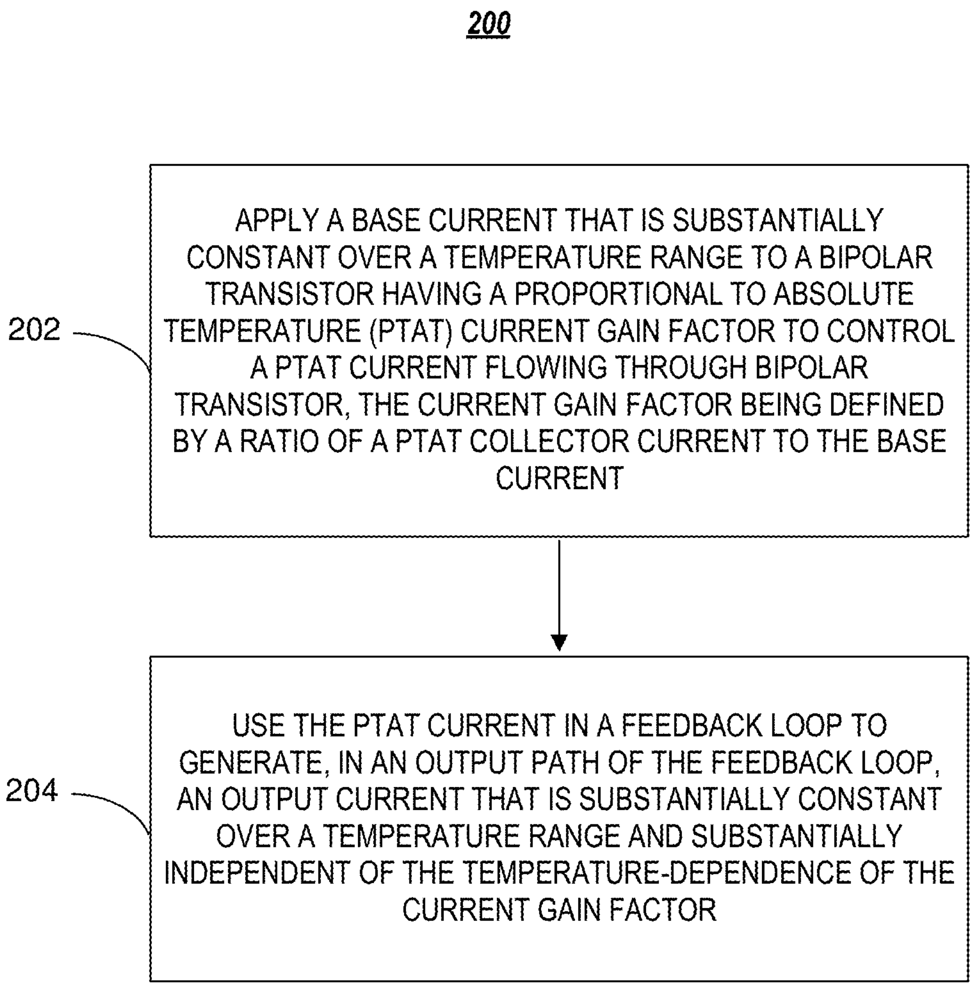
FIG. 2 is a flowchart of an illustrative process for operating the low-power current reference generator circuit in FIG. 1, in accordance with various embodiments of the present disclosure.

FIG. 2 is a flowchart of an illustrative process for operating the low-power current reference generator circuit in FIG. 1, in accordance with various embodiments of the present disclosure. In embodiments, process 200 for operating a current reference generator may start at step 202, when a base current that is substantially constant over a temperature range is applied to a device that has a proportional to absolute temperature (PTAT) device parameter. The base current controls a PTAT current that flows through the device. At step 204, the PTAT current may be used in a feedback loop to generate a constant output current that is substantially temperature-independent over a certain temperature range.

Figure 3:
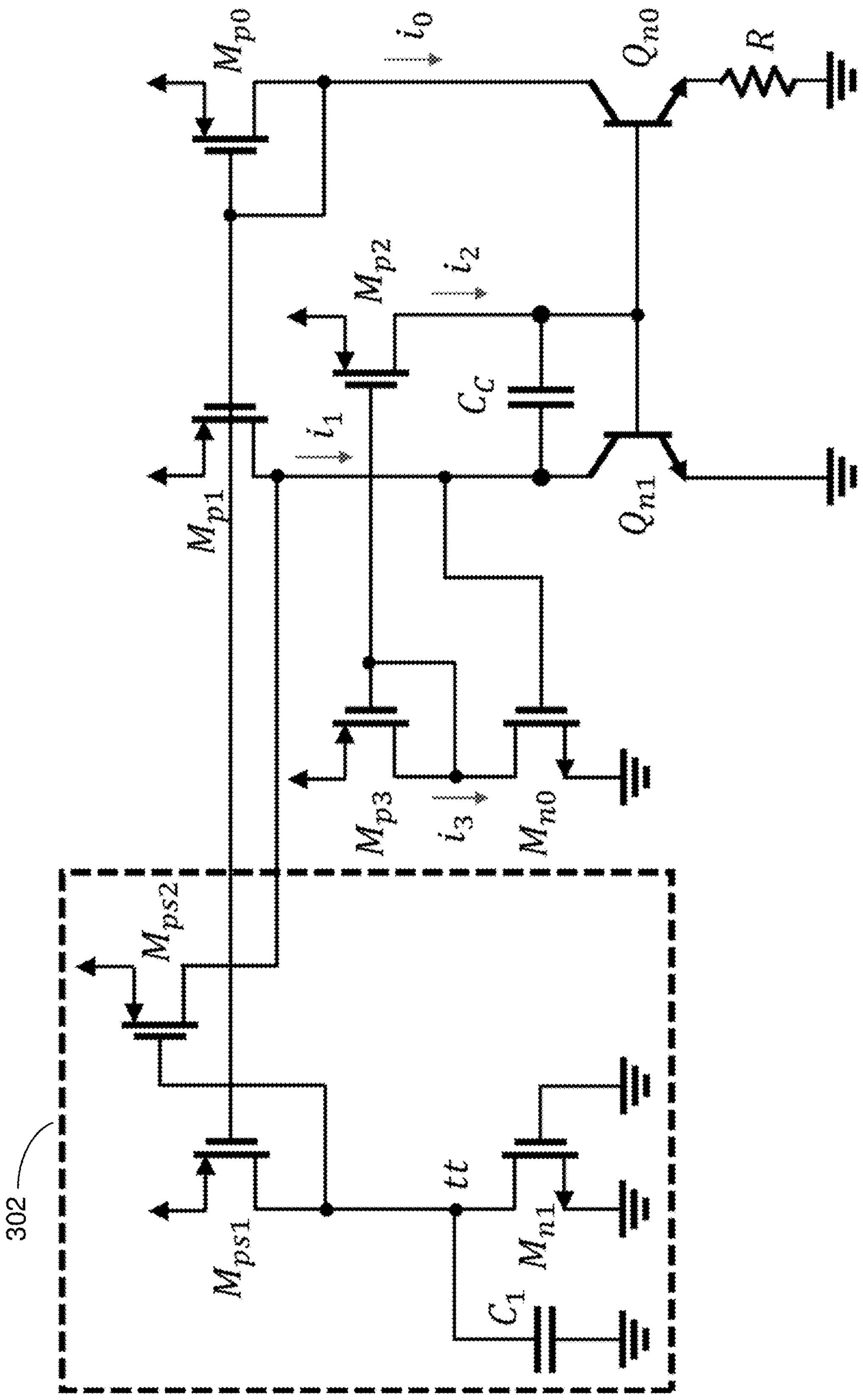
FIG. 3 is a simplified schematic of an exemplary system using a startup circuit for the low-power current reference generator circuit in FIG. 1, according to various embodiments of the present disclosure.

FIG. 3 is a simplified schematic of an exemplary system using a startup circuit for the low-power current reference generator circuit in FIG. 1, according to various embodiments of the present disclosure. System comprises startup circuit 302 that is coupled to a circuit that is substantially similar to the circuit in FIG. 1 with the exception of optional capacitor $C_c$. For purposes of brevity, a description or their function is not repeated here. In embodiments, capacitor $C_c$ may be used to stabilize the feedback loop that, in a manner similar to FIG. 1, may be formed by transistors $Q_{n1}$, $M_{n0}$, $M_{p2}$, and $M_{p3}$. It is understood that capacitor $C_c$ may be located between other voltage nodes and may be replaced by any number of other circuit elements as necessary. In embodiments, startup circuit 302 may comprise transistors $M_{ps1}$, $M_{ps2}$, and transistor $M_{n1}$, which may be implemented as any resistive element, and capacitor $C_1$.

Unlike in conventional startup circuits, the power consumption of startup circuit 302 is negligible. In embodiments, once supply voltage $V_{DD}$ ramps up after being turned on, the voltage at capacitor $C_1$ ramps up from zero Volts. Depending on capacitance, capacitor $C_1$ holds the voltage at node tt down such as to permit the voltage $V_{GS}$ of the PMOS devices $M_{ps1}$ and $M_{ps2}$ to rise above $V_{THP}$ (i.e., about 0.7 V) to turn on, assuming that each of the MOS devices operates in its triode region. In embodiments, the $V_{DD}$ at $M_{ps2}$ then causes $V_{DD}$ to be applied to the gate of transistor $M_{n0}$. The resulting $V_{GS}$ causes $M_{n0}$ to turn on and conduct a drain current $i_3$ that causes the voltage at the gate of $M_{p2}$ to be pulled down and, thus, $M_{p2}$ to turn on. The resulting base current is turns on BJTs $Q_{n0}$ and $Q_{n1}$. In short, the current flowing in the feedback loop turns on the BJTs.

Once the feedback loop enters regular operation, a current that is mirrored back to the startup circuit 302 flows through transistor $M_{ps1}$ and charges capacitor $C_1$ to a voltage that will be present at node tt. Once the capacitor voltage at that node exceeds $V_{DD}-V_{THP}$, transistor $M_{ps2}$ turns off, thus concluding the startup sequence. At this point, system 300 may continue to its operations without the help of circuit 302 that is no longer used.

Figure 4:
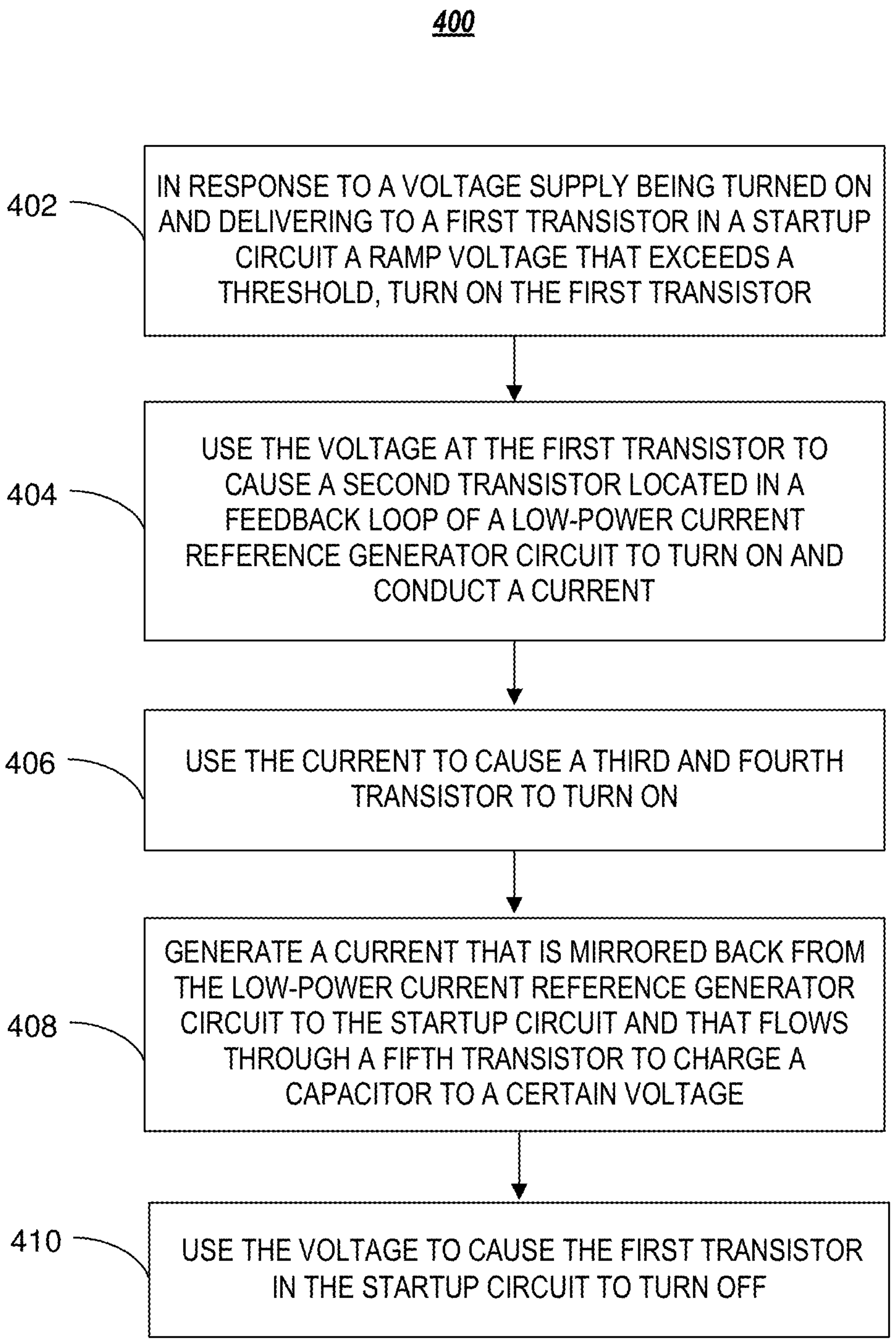
FIG. 4 is a flowchart of an illustrative startup process for the system shown in the arrangement in FIG. 3 according to various embodiments of the present disclosure.

FIG. 4 is a flowchart of an illustrative startup process for the system shown in FIG. 3, according to various embodiments of the present disclosure. In embodiments, startup process 400 may start at step 402, when the first transistor is turned on, e.g., in response to a voltage supply being turned on and delivering to a first transistor in a startup circuit a ramp voltage that exceeds threshold.

At step 404, the voltage at the first transistor may cause a second transistor located in a feedback loop of a low-power current reference generator circuit to turn on and conduct a current. In embodiments, this current may be used as an output current of the low-power current reference generator circuit.

At step 406, the current may cause third and fourth transistors, e.g., two bipolar transistors whose base terminals are coupled to each other, to turn on.

At step 408, a current mirrored back from the low-power current reference generator circuit to the startup circuit may flow through a fifth transistor and charge a capacitor to a voltage.

At step 410, in embodiments, that voltage may cause the first transistor in the startup circuit to turn off, thereby concluding the startup sequence.

One skilled in the art shall recognize that: (1) certain steps may optionally be performed; (2) steps may not be limited to the specific order set forth herein; (3) certain steps may be performed in different orders; and (4) certain steps may be done concurrently.

Figure 5A:
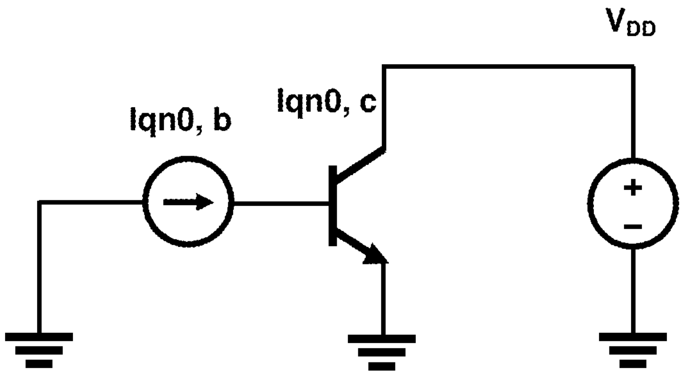
FIG. 5A is a simplified circuit used in Mote-Carlo simulations of a bipolar transistor such as that used in FIG. 3 according to various embodiments of the present disclosure.

FIG. 5A is a simplified circuit used in Mote-Carlo simulations of a bipolar transistor such as that used in FIG. 3 according to various embodiments of the present disclosure. It is noted that these experiments and results are provided by way of illustration and were performed under specific conditions using a specific embodiment or embodiments; accordingly, neither these experiments nor their results shall be used to limit the scope of the disclosure of the current patent document.

Figure 5B:
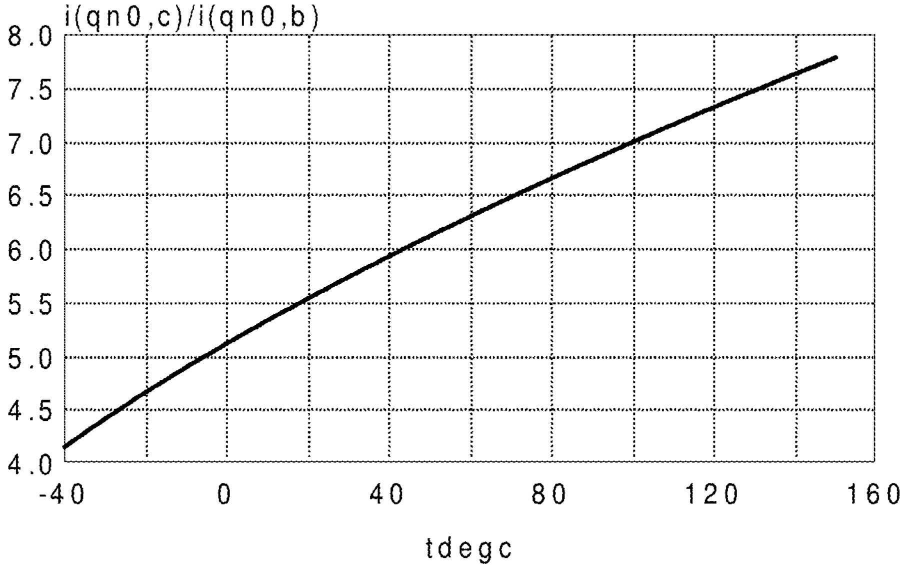
FIG. 5B shows experimental simulation results of the simulation using the circuit in FIG. 5A according to various embodiments of the present disclosure.

FIG. 5B shows experimental simulation results of the simulation using the circuit in FIG. 5A according to various embodiments of the present disclosure. Assuming a constant base current $I_b$ of 50 nA and a $V_{DD}$ are applied to the bipolar transistor, the collector current $i_c$ will vary with temperature. As can be seen in FIG. 5B, the beta factor of the simulated device, i.e., the ratio of the collector current over the base current of the BJT, is proportional to temperature, thus confirming the PTAT behavior of the device.

Figure 6A:
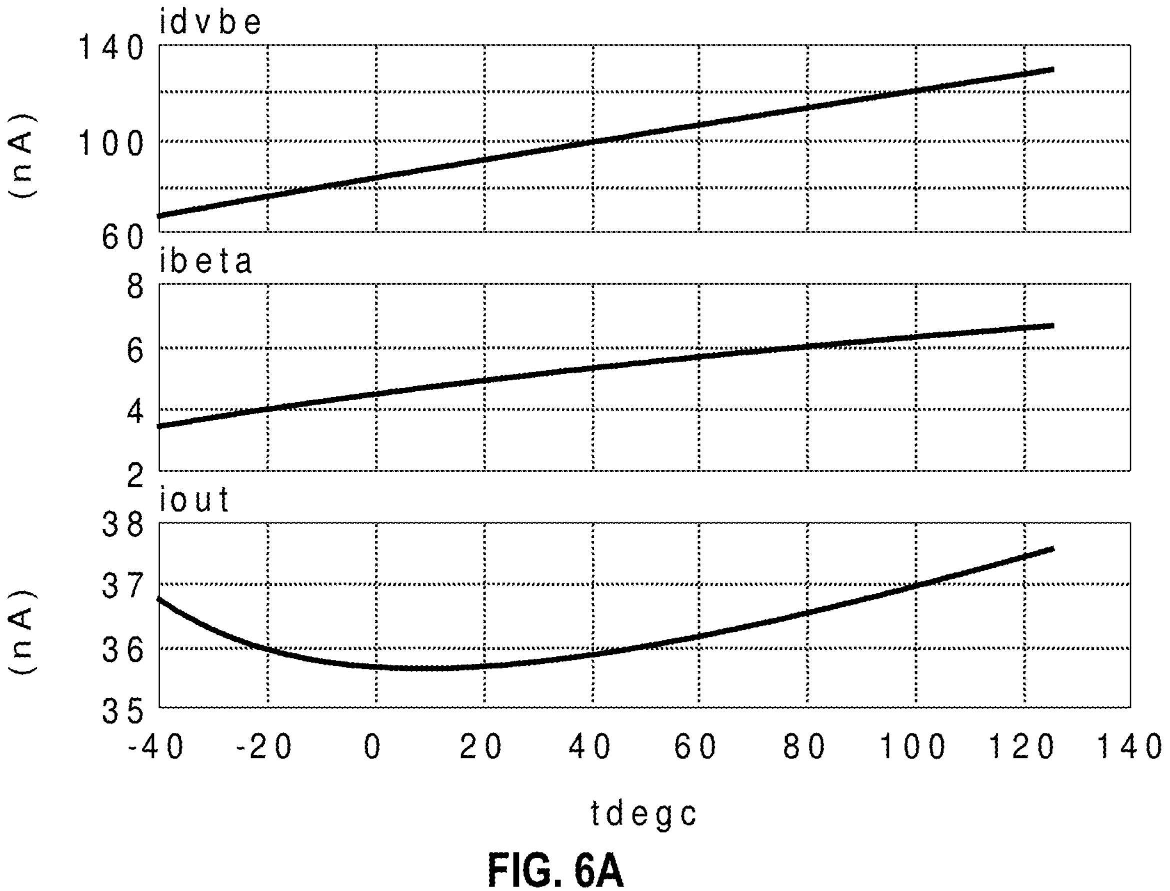
FIG. 6A shows experimental simulation results for a circuit such as that shown in FIG. 5A according to various embodiments of the present disclosure.

FIG. 6A shows experimental simulation results for a circuit such as that shown in FIG. 5A according to various embodiments of the present disclosure. As depicted in FIG. 6A, the ratio of the current generated by the base-emitter voltage difference $\Delta V_{be}$, denoted as "idvbe," and the beta factor of the BJT, denoted as "ibeta," yields a relatively constant output current, denoted as "iout."

Figure 6B:
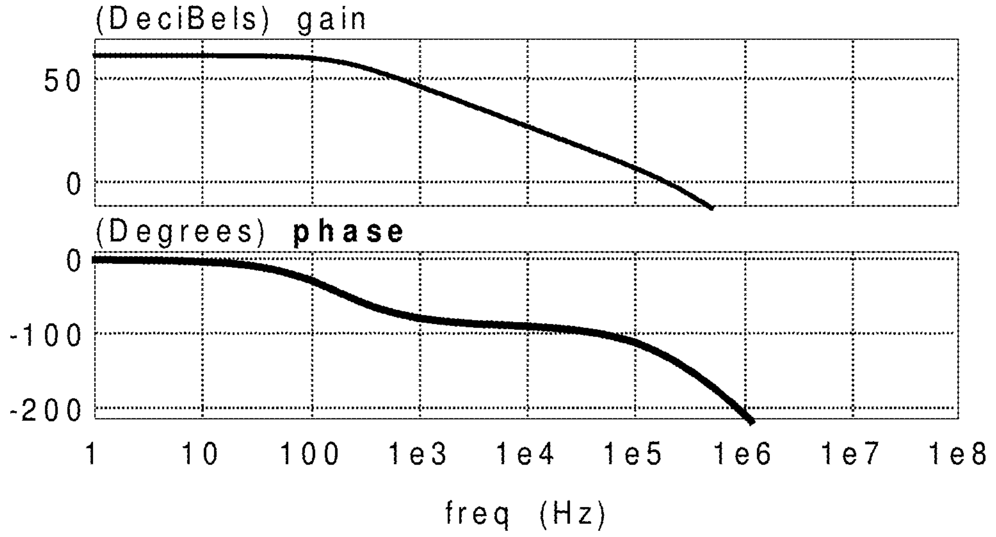
FIG. 6B shows simulated gain and phase plots associated with an internal feedback loop, such as that shown in FIG. 3 according to various embodiments of the present disclosure.

FIG. 6B shows simulated gain and phase plots associated with an internal feedback loop, such as that shown in FIG. 3 according to various embodiments of the present disclosure. The results demonstrate that adding the coupling capacitor "Cc" reduces the dominant pole to about 100 Hz. In embodiments, this yields a stable loop, here, having a phase margin of about 50 degrees Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for operating a current reference generator, the method comprising:

applying a base current that is substantially constant over a temperature range to a device having a proportional to absolute temperature (PTAT) device parameter to control a PTAT current flowing through the device; and using the PTAT current in a feedback loop that controls the base current to bias the device and mirrors the output current to the base current to generate an output current that is substantially constant over the temperature range.

2. The method of claim 1, wherein the output current is substantially independent of a temperature-dependence of a current gain factor of the device.

3. The method of claim 1, wherein a ratio of a PTAT collector current to the PTAT device parameter causes the base current be substantially constant over the temperature range.

4. The method of claim 3, wherein the device is a bipolar transistor.

5. The method of claim 4, wherein the bipolar transistor shares a common base with a second bipolar transistor, the base current is injected into the common base, the second bipolar transistor has an emitter terminal coupled to a resistor.

6. The method of claim 5, wherein the feedback loop is formed by the bipolar transistor, a pair of p-type metal-oxide-semiconductor (PMOS) transistors, and an n-type metal-oxide-semiconductor (NMOS) transistor.

7. The method of claim 6, wherein the output current is mirrored to the base current and in inverse proportion to a resistance of the resistor.

8. A stable current reference generator comprising:

a proportional to absolute temperature (PTAT) current generator circuit that generates a PTAT current;

a device having a PTAT device parameter and being controlled by a base current that is substantially constant over a temperature range; and a feedback loop that uses the PTAT current to control the base current to bias the device and mirror the output current to the base current to create an output current that is substantially constant over the temperature range.

9. The stable current reference generator of claim 8, wherein the device the device is a bipolar transistor.

10. The stable current reference generator of claim 9, wherein the bipolar transistor shares a common base with a second bipolar transistor, the base current is injected into the common base, the second bipolar transistor has an emitter terminal coupled to a resistor.

11. The stable current reference generator of claim 10, wherein the feedback loop is formed by the bipolar transistor, a pair of p-type metal-oxide-semiconductor (PMOS) transistors, and an n-type metal-oxide-semiconductor (NMOS) transistor.

12. The stable current reference generator of claim 11, wherein the output current is mirrored to the base current and in inverse proportion to a resistance of the resistor.

13. The stable current reference generator of claim 11 further comprising:

a capacitor coupled between the common base and an emitter of the bipolar transistor to stabilize the feedback loop.

14. A startup method for a low-power current reference generator circuit, the method comprising:

in response to a voltage supply being turned on and delivering to a first transistor in a startup circuit a ramp voltage that exceeds a threshold, turning on the first transistor;

using the voltage at the first transistor to cause a second transistor to turn on and conduct a current, the second transistor being located in a feedback loop of the low-power current reference generator circuit;

using the current to cause a third transistor and a fourth transistor to turn on; and generating a mirrored current that is mirrored back from the low-power current reference generator circuit to the startup circuit, the mirrored current flowing through a fifth transistor and charging a capacitor to a voltage that causes the first transistor in the startup circuit to turn off.

15. The startup method of claim 14, wherein the current is an output current of the low-power current reference generator circuit.

16. The startup method of claim 15, wherein the third transistor and the fourth transistor are bipolar transistors sharing a common base.

17. The startup method of claim 16, wherein the third transistor has a capacitor coupled between the common base and an emitter terminal to stabilize the feedback loop.

18. The startup method of claim 16, wherein the fourth transistor has an emitter terminal coupled to a resistor.

19. The startup method of claim 16, wherein the feedback loop is formed by the third transistor, a pair of p-type metal-oxide-semiconductor (PMOS) transistors, and an n-type metal-oxide-semiconductor (NMOS) transistor.

20. The startup method of claim 15, wherein the output current of the low-power current reference generator circuit is substantially constant over a temperature range.

* * * * *